(12) United States Patent
Lühmann et al.

(10) Patent No.: US 6,335,068 B1
(45) Date of Patent: *Jan. 1, 2002

(54) REDETACHABLE, SELF-ADHESIVE DEVICE

(75) Inventors: Bernd Lühmann, Norderstedt; Andreas Junghans, Hamburg; Thomas Raadts, Norderstedt, all of (DE)

(73) Assignee: Beiersdorf A.G., Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,050

(22) Filed: Jun. 8, 2000

Related U.S. Application Data

(62) Division of application No. 09/249,710, filed on Feb. 12, 1999, which is a division of application No. 08/924,788, filed on Sep. 5, 1997, now Pat. No. 5,928,747.

(30) Foreign Application Priority Data

Sep. 13, 1996 (DE) .......................................... 196 37 223

(51) Int. Cl.⁷ .................................................. C09J 7/02
(52) U.S. Cl. ...................... 428/40.1; 248/467; 248/683; 428/40.2; 428/41.3; 428/41.8; 428/42.1; 428/119; 428/192; 428/194
(58) Field of Search ............................... 428/40.1, 40.2, 428/41.3, 41.8, 42.1, 192, 194, 119; 248/467, 683

(56) References Cited

U.S. PATENT DOCUMENTS

| | | | |
|---|---|---|---|
| 5,516,581 A | 5/1996 | Kreckel | 428/343 |
| 5,672,402 A | 9/1997 | Kreckel | 428/343 |
| 5,928,747 A | 7/1999 | Lühmann | 428/40.1 |

FOREIGN PATENT DOCUMENTS

WO   WO 99/63018   12/1999

*Primary Examiner*—Nasser Ahmad
(74) *Attorney, Agent, or Firm*—Norris McLaughlin & Marcus

(57) ABSTRACT

Redetachable, self-adhesive device having a plate, the sides and/or front side of which have fastening means, if appropriate, and the rear side of which has a strip of an adhesive film which is adhesive on both sides and is adhesively attached in such a way that one end of the adhesive film protrudes beyond the plate as a grip, the adhesive film being of such a kind that the adhesive bond achieved with it can be released again by pulling in the direction of the bonding plane, stretching the strip, characterized in that the rear side of the plate (1) has laterally alongside the adhesively attached adhesive film (5) spacers (3A, 3B), the height of which is less than the thickness of the adhesive film (5).

35 Claims, 1 Drawing Sheet

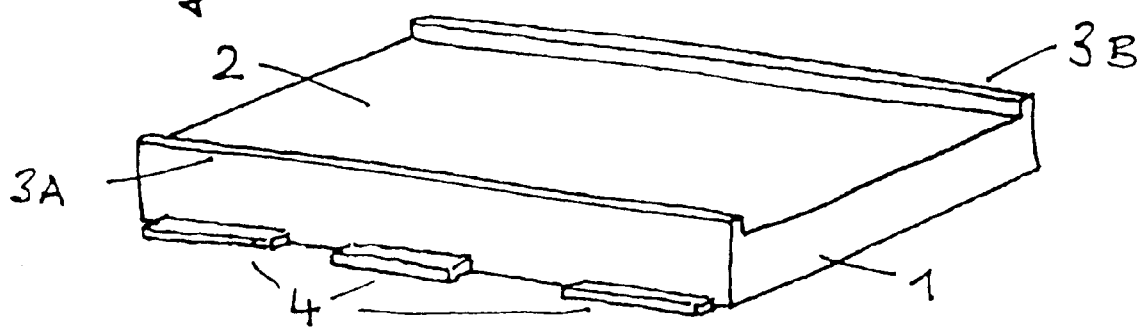
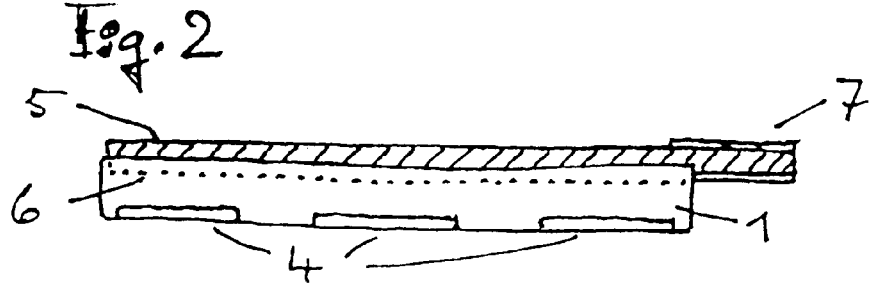
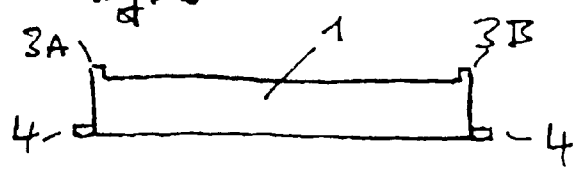
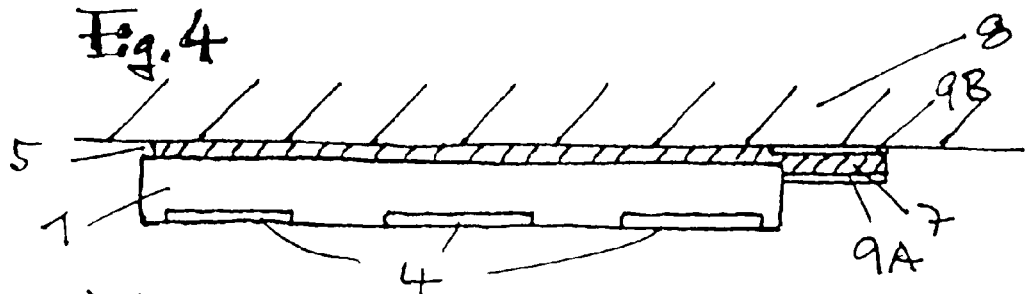
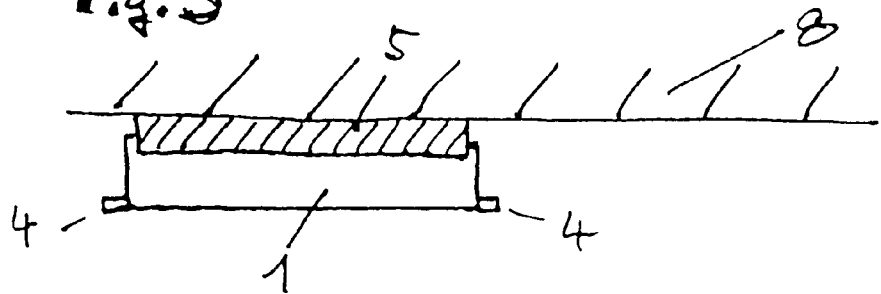

REDETACHABLE, SELF-ADHESIVE DEVICE

This application is a division of U.S. Ser. No. 09/249,710, which is now pending which is a Div of Ser. No. 08/924,788 filed Sep. 5, 1997, now U.S. Pat. No. 5,928,747.

BACKGROUND OF THE INVENTION

1. Field of the Invention

The invention relates to a redetachable, self-adhesive device which can be released again from its adhesive bond without leaving any residue by pulling on the adhesive film, arranged on it, in the direction of the bonding plane. In particular, the invention relates to a plate of this type, on which other things can be fastened if appropriate, or which itself is designed as a hook or the like if appropriate.

2. Description of Related Art

Such devices, in particular hooks, are known. For instance, DE 42 33 872 C2 describes a redetachable, self-adhesive hook which is equipped with an adhesive film which can be adhesively released by pulling and which is commercially available as "tesa® Power-Strips with Hooks". A so-called system hook with base plate and attachable decorative hook is also commercially available as the tesa® Power Strip System Hook.

WO 94/21157 also discloses such a hook, which differs from the abovementioned hook in particular by the use of an adhesive film of the kind which is highly extensible and at the same time does not recover its original form.

In the practical use of such devices, problems may occur, however, in particular during later detachment.

What is particularly disadvantageous about the previously known problem solutions is that the releasing of the adhesive bond has to take place by pulling the adhesive strips substantially in the bonding plane, errors in use being inevitable for the unexperienced user.

In many cases it has been found that tears are caused by the user exerting considerable force to press the item to be released against the object to which it is adhesively bonded during the releasing process. As a result, the force necessary for pulling the adhesive tape out of the adhesive joint is increased to such an extent that the tearing resistance is exceeded, with the unfortunate consequence for the user that the adhesive tape tears and the adhesive bond can no longer be released non-destructively and without leaving any residue.

The object of the invention was to overcome the aforementioned disadvantages.

SUMMARY OF THE INVENTION

This object is achieved by means of a device such as that characterized in more detail in the claims. Accordingly, the invention relates to:

A redetachable, self-adhesive device having a plate, the sides and/or front side of which have fastening means, if appropriate, and the rear side of which has a strip of an adhesive film which is adhesive on both sides and is adhesively attached in such a way that one end of the adhesive film protrudes beyond the plate as a grip, the adhesive film being of such a kind that the adhesive bond achieved with it can be released again by pulling in the direction of the bonding plane, stretching the strip, characterized in that the rear side of the plate (1) has laterally alongside the adhesively attached adhesive film (5) spacers (3A, 3B), the height of which is less than the thickness of the adhesive film (5).

In particular a device according to Claim 1, characterized in that the spacers (3A, 3B) are located on both sides alongside the adhesively attached adhesive film (5).

In particular a device according to Claim 1, characterized in that the spacers (3A, 3B) are formed as fillets or segments.

In particular a device according to Claim 1, characterized in that the spacers (3A, 3B) are arranged on both sides and, on each of these sides, at least in the region of the two ends.

In particular a device according to Claim 1, characterized in that it is formed as an injection-moulded part of plastic.

In particular a device according to Claim 1, characterized in that the height of the spacers (3A, 3B) is 35–90% of the thickness of the adhesive film (5), in particular is 0.3–0.6 mm in the case of a thickness of the adhesive film (5) of 0.65 mm.

In particular a device according to Claim 1, characterized in that the adhesive film (5), with or without an intermediate substrate, is elastically or plastically extensible.

In particular a device according to Claim 1, characterized in that the adhesion of the adhesive film (5) is less than the cohesion, the adhesiveness is dissipated to a great extent when the film is extended, and the ratio of pulling-off force to tearing load is at least 1:1.5, the adhesive film being of the kind which is based on thermoplastic rubber and tackifying resins, with high elasticity and low plasticity.

In particular a device according to Claim 1, characterized in that the rear side of the adhesive film (5) is covered with a release laminate, such as a siliconized release paper or a release film.

In particular a device according to Claim 1, characterized in that at the sides of the plate (1) there are engaging devices (4) into which a corresponding hook or the like can be engaged.

DETAILED DESCRIPTION OF THE INVENTION

The height of the spacers is advantageously chosen such that it is less than the thickness of the (unstretched) adhesive film, so that a satisfactory adhesive bond with the adherent surface is possible. The extension of the adhesive film occurring during the detachment operation causes the said film to be reduced correspondingly in width and thickness. If the thickness of the adhesive film reached during detachment is less than the height of the spacers, detachment of the adhesive film without tearing is even possible if high contact pressures occur at the same time vertically to the adhesive bond, which would otherwise have lead to tearing of the adhesive tape.

According to the invention, suitable in particular as adhesive films are those corresponding to DE 33 31 016, DE 42 22 849, DE 42 33 872, WO 92/11333 and WO 94/21157.

For instance, DE 33 31 016 A 1 describes an adhesive film for re-releasable adhesive bonds which allows an adhesive bond established therewith to be released by pulling on the adhesive film in the direction of the bonding plane. With such adhesive films, high adhesive forces and shear strengths can be achieved and adhesive bonds can be released again without further aids, in a way comparable to the opening of a preserving jar, similar to the way in which there the rubber seal is pulled by the grip out of the seal joint.

DE 42 22 849 C 1 describes such an adhesive film with a UV-impermeable grip.

WO 92/11333 also describes, inter alia, adhesive films for corresponding applications, the adhesive films used having a low elasticity with at the same time high extension.

Double-sided self-adhesive tapes with a foam intermediate substrate, for example of polyethylene foam, can also be used according to the invention.

In general, for production, processing and handling of the particularly preferred adhesive films, reference is made to DE 33 31 016, DE 42 22 849 and WO 92/11333.

Suitable as the material for the plate or moulding, in particular for base plates, are:

Plastic, metal, wood (coated, for example painted, and uncoated), ceramic and the like.

Devices according to the invention serve for receiving one side of the adhesive film, the other side of which is adhesively bonded onto the selected under-lying surface. A wide variety of adapters, including hook bodies, can be placed onto the device or plate. To produce a high bonding strength, the surface of the plate on the side to which the adhesive film is applied consists in particular of a material which has an adhesion with respect to the adhesive film which is adequate for the respective application. When using contact adhesives based on styrene block copolymers or acrylate copolymers, advantageously used in this case are, inter alia, polystyrene, impact-modified polystyrenes, PMMA, aromatic polyesters, polycarbonate or polyamide.

To accomplish a pulling-off behaviour without tearing, even under the effect of high forces acting perpendicularly with respect to the bonding plane (for example caused by high contact pressure when releasing the adhesive bond), the plate is equipped with spacers (for example fillets), as still to be described in detail, on the side which bears the adhesive film.

Spacers may be provided on both sides alongside the adhesive film over the entire length of the base plate, or else only in certain subregions thereof. Specific formations, right-angled fillet-like, rounded-off fillet-like, punctiform etc., are possible. A spacer may be arranged at one of the end faces on the rear side of the plate (1) alongside the adhesively attached adhesive film strip (5).

Tests with different redetachable adhesive films show that, depending on the type and structure of the adhesive films used, typical stripping extensions lie between 100% and 800%. In practice, it is found that, in the case of substantially rubber-elastic adhesive films, the height of the spacers should be at least about 0.05 mm, preferably 0.10 mm, higher than the thickness of the stretched adhesive films during the detachment process. For a reliable adhesive bond, on the other hand, the spacer height should be kept about 0.05 mm, preferably 0.1 mm, particularly preferably 0.15 mm, less than the thickness of the adhesive films in the non-stretched state. The values specified relate to planar, solid adherent surfaces. In the case of rough and/or slightly deformable adherent surfaces, values higher than those quoted may be advisable both for a satisfactory bonding process (adequate contact pressure) and for satisfactory redetachment.

BRIEF DESCRIPTION OF THE DRAWINGS

The invention is to be explained in more detail below with reference to exemplary embodiments, without however wishing to restrict it unnecessarily. In the drawing:

FIG. 1 shows an obliquely lateral view of a device according to the invention, FIG. 2 shows a side view according to FIG. 1, with an adhesively attached adhesive film strip, FIG. 3 shows an end view according to FIG. 1, FIG. 4 shows a side view according to FIG. 2, the device being adhesively attached by its adhesive film strip to an object, and FIG. 5 shows an end view according to FIG. 4.

To be specific, FIG. 1 shows a plate 1 with a rear side 2, which serves for receiving a strip of double-sided adhesive film and has spacers 3A, 3B in the form of fillets to the sides of the adhesive film to be adhesively attached. On its sides, the plate 1 also has engaging devices 4, into which a corresponding device can engage, for instance a plate with a hook or some other fastening device, as is standard and commercially available.

FIG. 2 shows how a strip 5 of an adhesive film is adhesively attached to the plate 1, it being indicated by the dotted line 6 how the spacers 3A and 3B partially enclose the strip 5 to the sides, while one end of the adhesive film protrudes beyond the plate 1 as a grip 7. In FIG. 3, as an end view of the plate 1, the latter is represented with the spacers 3A, 3B and also with the engaging devices 4.

FIG. 4 shows in a lateral view how such a device is adhesively attached to an object 8, for instance a wall, a door or a cupboard, with plate 1, strip 5 of an adhesive film, the grip 7 protruding beyond one end of the plate 1, the grip 7 being made non-adhesive by thin films 9A, 9B. In FIG. 5, this arrangement is represented in an end view, with plate 1, strip 5 of an adhesive strip, and also spacers 3A, 3B which laterally enclose the strip 5 and extend to about half the thickness of the strip 5.

EXAMPLE

For a single-layer adhesive film of the following formulation:

50 parts of Foralyn 110 (Hercules), 50 parts of Vector 4211 (Exxon Chemical), 0.5 parts of Irganox 1010 (Ciba)

of a thickness of 650 μm, a maximum tensile force of 52 N/cm, corresponding to 8.0 MPa, and an ultimate elongation of 1300% are determined.

Rectangular pieces of the adhesive film measuring 20 mm×50 mm are adhesively bonded centrally to base plates consisting of steel of the dimensions 3 mm×40 mm×22 mm (height×length×width) in such a way that the base plates are covered on one side over their entire length by the adhesive film and a 10 mm long strip of adhesive film protrudes beyond one of the short sides of the base plate, which can be used as a grip for later detachment. The base plates are provided on both longitudinal edges on the side to which the adhesive films are applied with spacers 0.5 mm wide and of different heights. The base plates provided with adhesive films are adhesively bonded onto a planar underlying surface of Resopal. For this purpose, the base plates provided with the adhesive films are applied flatly to the underlying Resopal surface and pressed onto it with 500 N for 5 seconds. In a second operation, for detaching the adhesive films, the test pieces fixed in this way are subjected to a force of likewise 500 N, acting vertically onto the bonding plane, and then the adhesive film strip is pulled out of the adhesive joint at an angle of <10° with respect to the bonding plane. For comparison, the tests are carried out without any force acting vertically on the bonding plane. The stripping rate in all the tests is about 1000 mm/min. The following results are obtained.

| Height of the spacers | Vertical pressing force 500 N | Without vertical force |
| --- | --- | --- |
| No spacer | Strip tears | Can be detached without tearing |
| 0.3 mm Stripping force* | Can be detached without tearing 10//14 N/cm | Can be detached without tearing |
| 0.4 mm Stripping force* | Can be detached without tearing 9//15 N/cm | Can be detached without tearing |
| 0.5 mm Stripping force* | Can be detached without tearing 9//10 N/cm | Can be detached without tearing |
| 0.6 mm Stripping force* | Can be detached without tearing 9//10 N/cm | Can be detached without tearing |
| 0.7 mm | No adhesive bonding possible | No adhesive bonding possible |

*Mean value//maximum value (the maximum value is reached at the end of the stripping operation).

Under the chosen test conditions, only base plates provided with spacers can be detached again without tearing under the effect of high vertical forces acting on the base plate.

What is claimed is:

1. A releasable, self-adhesive device comprising:
   a) a plate having a front, a rear and four sides; and
   b) a double-sided adhesive strip of film adhered to the rear of said plate through an adhesive bond in such a way that one end of said adhesive film strip protrudes from said plate as a grip; wherein
   the adhesive bond between said adhesive film strip and said plate can be released by pulling and stretching the adhesive film strip; and
   spacers are arranged on both sides on the rear of said plate alongside the adhesively attached adhesive film strip, said spacers extending less than the entire length of said plate, and said spacers projecting from the rear of said plate to a height that is less than the thickness of said adhesive film strip.

2. Device according to claim 1, wherein the spacers are formed as fillets or segments.

3. Device according to claim 1, wherein the spacers are arranged on both sides and, on each of these sides, at least in the region of the two ends.

4. Device according to claim 1, which is formed as an injection-moulded part of plastic.

5. Device according to claim 1, wherein the height of the spacers is 35–90% of the thickness of the adhesive film strip.

6. Device according to claim 1, wherein the adhesive film strip, with or without an intermediate substrate, is elastically or plastically extensible.

7. Device according to claim 1, wherein the adhesion of the adhesive film strip is less than the cohesion, the adhesiveness is to a great extent dissipated when the film is extended, and the ratio of pulling-off force to tearing load is at least 1:1.5, the adhesive film being of the kind which is based on thermoplastic rubber and tackifying resins, with high elasticity and low plasticity.

8. Device according to claim 1, wherein the rear side of the adhesive film strip is covered with a release laminate.

9. Device according to claim 1, wherein at the sides of the plate there are engagement devices into which a corresponding hook can be engaged.

10. Device according to claim 1, wherein a spacer is arranged at one of the ends on the rear side of the plate alongside the adhesively attached adhesive film strip.

11. Device according to claim 5, wherein the height of the spacers is 0.3–0.6 mm and the thickness of the adhesive film strip is 0.65 mm.

12. Device according to claim 8, wherein the release laminate is a siliconized release paper or a release film.

13. Device according to claim 1, wherein the spacers have a rounded-off shape.

14. Device according to claim 9, further comprising a hook engaged with said engagement devices.

15. A method of forming a temporary bond between a substrate and a device according to any one of claims 2–10, 1, and 11–14, which bond can be released easily and without residue, said method comprising adhering said device to said substrate by means of an adhesive bond formed between said substrate and said adhesive film strip, and thereafter releasing said device from said substrate by pressing said plate and said adhesive film strip against said substrate and pulling on the grip of said adhesive film strip at an angle approximately perpendicular to the plane of the bond formed between said substrate and said adhesive film strip.

16. A self-adhesive device for detachable adhesive bonding onto an underlying surface, comprising:
   a plate having a rear side, the rear side having at least one spacer extending less than the entire length of said plate and a planar surface;
   a strip of double-sided adhesive film adhesively attached to said planar surface, one end of the adhesive film protruding beyond the plate as a grip; and
   at least one engaging device disposed on the plate for engaging an adapter;
   wherein the spacer height is less than the thickness of the adhesive film an adhesive bond between said adhesive film and said plate can be released by pulling on the adhesive film in the direction of the plane of said bond.

17. The device of claim 16 wherein the rear side has two ends, a spacer being disposed at one end, and said grip protruding beyond the other end.

18. The device of claim 16 wherein the adhesive film has a foam intermediate substrate.

19. The device of claim 17 wherein the adhesive film has a foam intermediate substrate.

20. The device of claim 16, 17, 18 or 19 further comprising an adapter engaged to the plate.

21. The device of claim 20 wherein the adapter is a fastening device.

22. The device of claim 21 wherein the fastening device is a hook.

23. The device of claim 17 wherein the spacer has a rounded-off shape.

24. The device of claim 16 or 17 wherein the plate is formed of plastic.

25. The device of claim 16 or 17 wherein the adhesive film can be detached by pulling without tearing.

26. A method of forming a temporary bond between a substrate and a device according to any one of claims 16–25, which bond can be released easily and without residue, said method comprising adhering said device to said substrate by means of an adhesive bond formed between said substrate and said adhesive film strip, and thereafter releasing said device from said substrate by pressing said plate and said adhesive film strip against said substrate and pulling on the grip of said adhesive film strip at an angle approximately perpendicular to the plane of the bond formed between said substrate and said adhesive film strip.

27. A device for removably, adhesively attaching to a support surface, comprising:
   a base member having a bottom surface and a mount for releasably engaging with an adapter;

a stretch release double-sided adhesive strip disposable between the bottom surface and the support surface; and at least one spacer disposed on the bottom surface of the base member for engaging the support surface when the base member is urged in the direction of the support surface, the height of the spacer being less than the thickness of the adhesive film, and said spacer extending less than the entire length of said base member.

28. The device according to claim 27, further comprising an adapter.

29. The device according to claim 28, wherein the base member has two ends and wherein the adhesive strip is configured to extend beyond one end and to be grippable when the adapter is disengaged to stretch the adhesive strip.

30. The device according to claim 29, wherein the adapter is a hook body.

31. The device according to claim 27, wherein the base member is a molded plastic member.

32. The device according to claim 28, 29, 30 or 31, wherein the spacer is an abutment.

33. The device according to claim 32, wherein the adhesive strip has a foam intermediate substrate.

34. The device according to claim 33, wherein the adhesive strip releases from the support surface when stretched without leaving a residue on the support surface.

35. A method of forming a temporary bond between a substrate and a device according to any one of claims 27–34, which bond can be released easily and without residue, said method comprising adhering said device to said substrate by means of an adhesive bond formed between said substrate and said adhesive film strip, and thereafter releasing said device from said substrate by pressing said base member and said adhesive film strip against said substrate and pulling on the grip of said adhesive film strip at an angle approximately perpendicular to the plane of the bond formed between said substrate and said adhesive film strip.

* * * * *